(12) United States Patent
Platel et al.

(10) Patent No.: US 10,142,336 B2
(45) Date of Patent: Nov. 27, 2018

(54) COMMUNICATION SYSTEM AND METHOD

(71) Applicant: Schneider Electric Industries SAS, Rueil Malmaison (FR)

(72) Inventors: Laurent Platel, Saint Martin D'Heres (FR); Thierry Chiche, Saint Ismier (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 44 days.

(21) Appl. No.: 15/010,451

(22) Filed: Jan. 29, 2016

(65) Prior Publication Data

US 2016/0226887 A1    Aug. 4, 2016

(30) Foreign Application Priority Data

Feb. 2, 2015 (FR) ..................... 15 50766

(51) Int. Cl.
 *H04L 29/06* (2006.01)
 *H04L 29/08* (2006.01)
(52) U.S. Cl.
 CPC ........ *H04L 63/0876* (2013.01); *H04L 63/045* (2013.01); *H04L 63/061* (2013.01); *H04L 67/14* (2013.01); *H04L 67/12* (2013.01)
(58) Field of Classification Search
 CPC ..... H04L 63/08; H04L 63/0876; H04L 63/06; H04L 63/061; H04L 63/04; H04L 63/0428; H04L 63/0435; H04L 67/14; H04L 67/141; H04L 67/143; H04L 67/146; H04L 67/12; H04L 63/045
 See application file for complete search history.

(56) References Cited

U.S. PATENT DOCUMENTS

| 7,502,323 | B2  |   3/2009 | Brun et al. |
| 2003/0226017 | A1* | 12/2003 | Palekar ............... H04L 63/0428 713/168 |
| 2007/0136801 | A1* |  6/2007 | Le ......................... H04L 63/102 726/10 |
| 2007/0157027 | A1  |  7/2007 | Palekar et al. |

(Continued)

FOREIGN PATENT DOCUMENTS

| FR | 2 866 169 A1 | 8/2005 |
| WO | WO 2015/082607 A1 | 6/2015 |

OTHER PUBLICATIONS

French Preliminary Search Report dated Dec. 8, 2015 in French Application 15 50766, filed on Feb. 2, 2015 ( with English translation of categories of Cited Documents).

(Continued)

*Primary Examiner* — Ayoub Alata
(74) *Attorney, Agent, or Firm* — Oblon, McClelland, Maier & Neustadt, L.L.P.

(57) ABSTRACT

A communication analysis method is implemented in a first device that receives communication frames originating from a second device. The first device and the second device establish a communication between themselves in a secure communication session. The method includes analyzing parameters of the communication during the reception of the communication frame in relation to parameters stored for the communication, and deciding on a renewal or a maintenance of the secure communication session according to the analysis carried out.

6 Claims, 2 Drawing Sheets

(56) References Cited

U.S. PATENT DOCUMENTS

2009/0171950 A1\* 7/2009 Lunenfeld ......... G06F 17/30864
2010/0165072 A1\* 7/2010 Oike ................... H04L 12/1822
348/14.09
2012/0120858 A1 5/2012 Das et al.

OTHER PUBLICATIONS

Kihong Kim et al. "A Secure and Efficient Communication Resume Protocol for Secure Wireless Networks", Grid and Cooperative Computing, 2004, 12 pages.

\* cited by examiner

COMMUNICATION SYSTEM AND METHOD

TECHNICAL FIELD OF THE INVENTION

The present invention relates to a communication system and method.

The invention relates more precisely to a communication system in which a first device and a second device communicate in a secure communication session, including at least one authentication phase.

PRIOR ART

In most known communication protocols, for example WIFI IEEE802.11 or Bluetooth, a first device and a second device communicate in a secure communication session. This secure communication session is characterized by a prior authentication phase comprising the definition of a session key and enabling a check that the second device is in fact authorised to communicate with the first device. The session key is defined for a limited time period in order to maintain the security of the communication. A plurality of secure communication sessions may be concatenated with a session key negotiation phase at the start of each session.

In some applications, for example the feedback of measurement data from sensors to a data-collecting unit, the volume of exchanged data and the frequency of transmission of the data may be very low. A sensor will be able, for example, to transmit data after a long period of silence. Moreover, the sensors used are often designed to consume little energy. They are even sometimes energy self-sufficient through the use of energy generators, for example photovoltaic generators.

For this type of application, it is therefore necessary to limit the energy consumption linked to the communication between the two devices. In other words, a sensor must not consume too much energy in order to authenticate itself when its data volume to be sent is very low and the energy necessary to send these data is also very low.

The object of the invention is to propose a wireless communication system, including a first device and a second device, enabling a limitation of the energy consumption linked to each authentication phase implemented in order to open a communication session. The object of the invention is also to propose the communication method implemented in said system.

The solution according to the invention consists in reducing the energy footprint of the communication by means of an optimisation of the mechanisms for establishing and maintaining the security of the communication.

This object is achieved by a communication analysis method implemented in a first device configured to receive communication frames originating from a second device, said first device and said second device being configured to establish a communication between themselves in a secure communication session, said method, including the following steps:

a step of storing parameters linked to the communication established with the second device during the secure communication session, an analysis step implemented on receiving a communication frame originating from the second device and including an analysis of the parameters of the communication during the reception of the communication frame in relation to the parameters stored for said communication, a step of determining a renewal or a maintenance of the secure communication session according to the analysis carried out.

According to one particular characteristic, the analysis step is implemented according to a basic analysis mode or according to an advanced analysis mode and in that, in the basic analysis mode, the stored parameters of the communication comprise:

the frequency of reception of a communication frame originating from the second device, the timestamping of the last received communication frame.

According to a different particular characteristic, in advanced analysis mode, the stored parameters of the communication comprise:

the type of data, the position of the data in the communication frame, the normal interval of the received data, the number of distinct data in the communication frame.

According to a different particular aspect, the analysis step comprises a step of checking a level of confidence assigned to the second device, said level of confidence being downgraded in the event of inconsistency between the parameters of the communication during the reception of the communication frame and the parameters stored for said communication.

The invention also concerns a wireless communication system, including:

a first device configured to receive communication frames, a second device being configured to transmit communication frames destined for the first device, said first device and said second device being configured to establish a communication between themselves in a secure communication session, including at least one authentication phase, said system being characterized in that the first device comprises:

means for storing parameters linked to the communication established with the second device during the communication session, an analysis software module configured to analyse parameters of the communication during the reception of a communication frame originating from the second device in relation to the parameters stored for said communication and to determine a renewal or a maintenance of the secure communication session according to the analysis carried out.

According to one particular feature of the system, the analysis software module can operate according to a basic analysis mode or according to an advanced analysis mode and in that, in the basic analysis mode, the stored parameters of the communication comprise:

the frequency of reception of a communication frame originating from the second device, the timestamping of the last received communication frame.

According to a different particular characteristic, in advanced analysis mode, the stored parameters of the communication comprise:

the type of data, the position of the data in the communication frame, the normal interval of the received data, the number of distinct data in the communication frame.

According to a different particular feature, the analysis software module comprises a module for checking a level of confidence assigned to the second device, said level of confidence being downgraded in the event of inconsistency between the parameters of the communication during the reception of the communication frame and the parameters stored for said communication.

BRIEF DESCRIPTION OF THE FIGURES

Other characteristics and advantages will be evident from the detailed description that follows, given with reference to the attached drawings, in which.

DETAILED DESCRIPTION OF AT LEAST ONE EMBODIMENT

Figure 1:
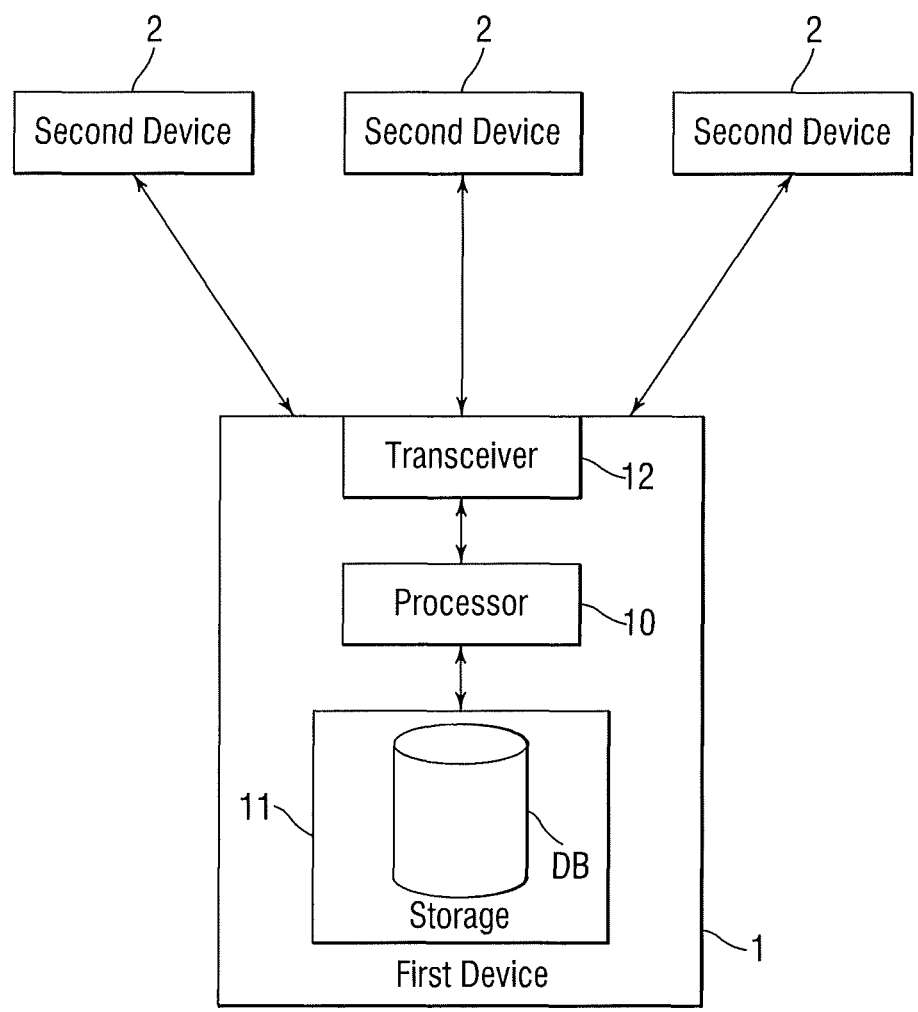
FIG. 1 shows schematically the communication system according to the invention.

The invention concerns a wireless communication system, including at least a first device 1 and a second device 2. The communication between the first device 1 and a second device 2 may involve different types of communication relays or intermediate devices responsible for performing the data transmission.

The first device 1 will be, for example, a measurement data collecting unit, such as, for example, a server, intended to collect data originating from one or more sensors. It comprises a processing unit equipped with a microprocessor 10 and storage means 11 and a transceiver 12 controlled by the microprocessor 10 in order to send data to the second device 2 and to receive data originating from the second device 2.

The second device 2 will be, for example, a sensor responsible for sending measurement data to the data-collecting unit forming the first device 1. It could be a temperature, gas or humidity sensor or a sensor of any other conventionally measured quantity. The sensor will preferably have a low energy consumption and will be designed to feed measurement data back to the data-collecting unit with a given frequency or in a random manner.

The second device 2 notably comprises a microcontroller and a transceiver controlled by the microcontroller in order to send data to the first device 1 or to receive data from the first device 1.

In FIG. 1, a plurality of "second devices" 2 of the sensor type are shown in communication with the first device.

The invention aims to optimise the energy consumption of the second device 2 by reducing the number of session key renegotiations while keeping the safety level of the communication. The invention will therefore allow each secure communication session to be maintained for as long as possible.

As a general rule, when the second device 2 must send data to the first device 1, the opening of a secure communication session proceeds in the following manner:
  transmission by the second device 2 of a request to open a session, destined for the first device 1, said request comprising at least one identifier of the second device 2,
  checking by the first device 1 of the identifier of the second device 2 in a database,
  if the second device 2 is identified by the first device 1, the latter determines the parameters of the secure session. These parameters are notably a session key and a specific identifier for the session to be opened,
  the first device 1 transmits the session key and the session identifier to the second device 2, these parameters being encrypted by the first device 1 for dispatch to the second device 2,
  once the session parameters have been received by the second device 2, the latter can then transmit data destined for the first device 1 in the secure communication session. The transmitted measurement data are encrypted using the session key and are sent in encrypted form to the first device 1, specifying the identifier of the session in progress.

As a general rule, the secure communication session has a limited time period. After a determined time period, with each new data transmission by the second device 2 or at the request of one of the two devices, the secure communication session must be renegotiated. This entails a new authentication phase, a new generation of a session key, etc. Now, each establishment of a new communication session is costly in terms of electrical energy, notably for low-consumption sensor devices. Furthermore, the volume of the measurement data transmitted by the second device 2 may can be low in comparison with the volume that is necessary for the establishment of the secure communication session.

The invention therefore aims to enable a secure communication session to be maintained for as long as possible in order to save the electrical energy available in the second device 2, while maintaining a high level of security on the exchanged data.

To do this, the microprocessor 10 of the processing unit of the first device 1 runs an analysis software module equipped with a decision algorithm. This analysis software module is, for example, stored in the storage means 11 and enables a decision to be made, for example with each reception of a new communication frame originating from the second device 2, as to whether the secure communication session must be maintained or renewed. While this algorithm is running, the first device 1 analyses the parameters of the communication in progress.

Two analysis modes can then be envisaged: a basic analysis mode and an advanced analysis mode. The analysis software module is configured to compare parameters linked to the communication with parameters stored in a database DB stored in the storage means 11. In the advanced analysis mode, the analysis software module is configured to read the communication frame and extract relevant information from it enabling the level of confidence assigned to the second device 2 to be checked.

In the basic analysis mode, the analysis software module of the first device 1 can check the following parameters:
  the frequency of reception of a communication frame originating from the transmitting device,
  the timestamping of the last received communication frame,
  the length of the received communication frame,
  if a radio communication is involved, the position of the transmitter of the communication frame.

In the advanced analysis mode, in addition to the parameters listed above for the basic analysis mode, the analysis software module of the first device 1 can also check:
  the type of data received, for example whether a temperature, pressure, current value, etc., is involved,
  the position of the data in the received communication frame,
  the normal interval of the received data, i.e. whether the received data remain within a range of normal values,
  the number of distinct data in the communication frame, the shape of the curve of these data when these data are measurements, i.e. linear, sinusoidal, etc.

Other parameters of the communication could obviously be envisaged.

In each of the two modes, the analysis software module can implement a check on certain criteria only. Similarly, it can implement the basic analysis mode and switch at regular intervals or in a random manner to the advanced analysis mode, notably when the session has not been renewed for a certain time.

The database thus comprises a list of all the devices with which the first device 1 is or has been in communication. For each secure communication session in progress with each device, the database DB is updated with the parameters of the communication listed above, taking account of the analysis mode, basic or advanced, implemented with each device.

Figure 2:
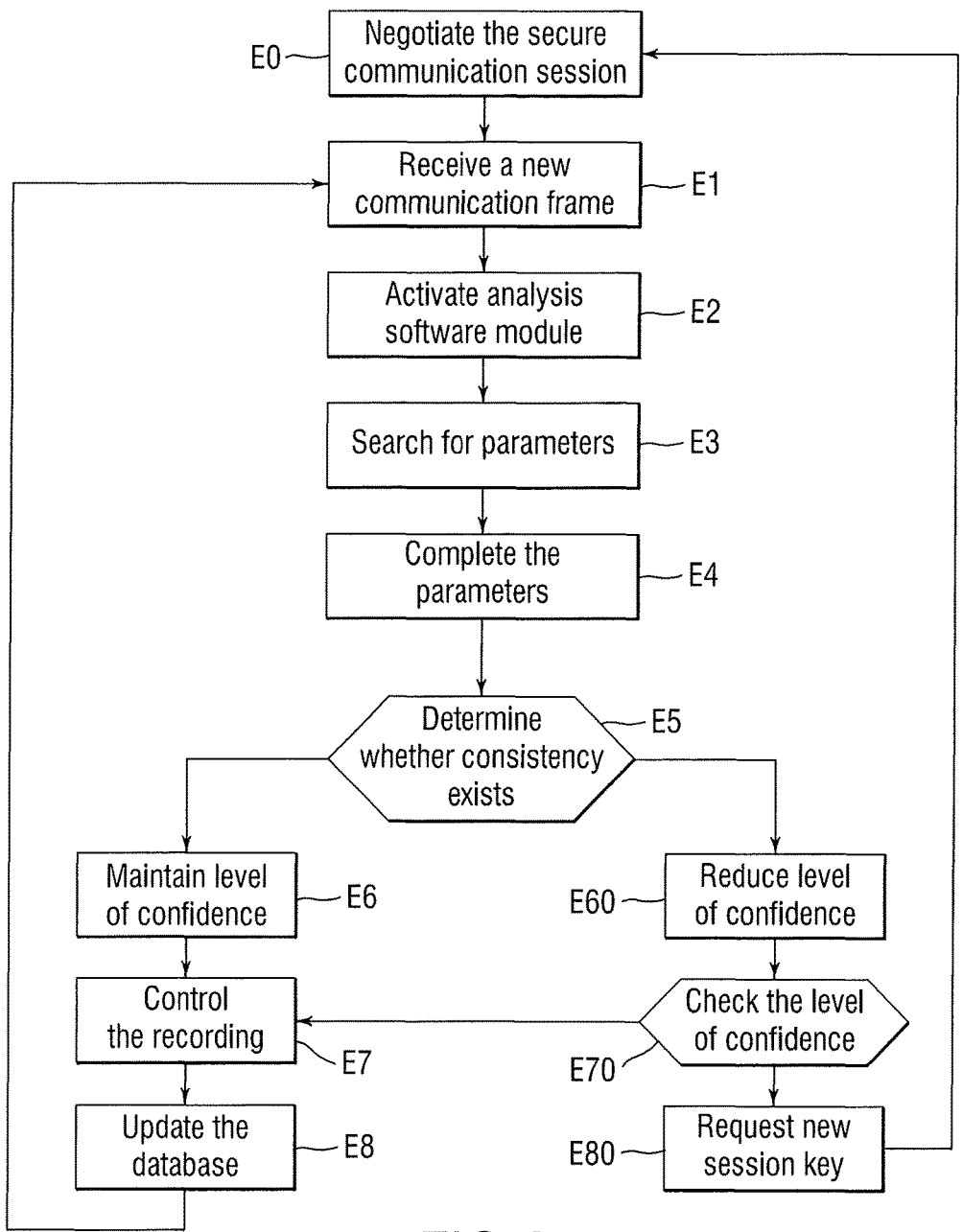
FIG. 2 shows the algorithm implemented for the analysis of the communication.

With reference to FIG. 2, the secure communication session is negotiated in step E0. The first device 1 and the second device 2 communicate with one another in order to open a secure communication session in accordance with the steps described above. The level of confidence assigned to the second device 2 by the first device 1 is at the maximum. The level of confidence is, for example, implemented by a counter, the value of which is decremented when the level of confidence assigned to the device concerned decreases.

In step E1, the first device 1 receives a new communication frame originating from the second device 2.

In step E2, the analysis software module is activated in order to analyse the parameters of the communication linked to this communication frame. During this analysis, the analysis software module extracts the relevant data from the communication frame according to the implemented analysis mode, i.e. basic or advanced.

In step E3, the analysis software module searches for the parameters of the communication stored in its database DB during preceding secure communication sessions and updated during the secure communication session in progress.

In step E4, the analysis software module compares the parameters of the communication extracted on reception of the new communication frame with the communication parameters stored in the database DB.

In step E5, the analysis software module determines whether a consistency exists between the parameters of the communication extracted for the communication frame and the stored parameters of the communication.

In step E6, if a consistency is established, the level of confidence assigned to the second device is maintained, resulting in the maintenance of the secure communication session with the second device 2.

In step E7, the analysis software module then controls the recording of the data present in the analysed communication frame.

In step E8, the analysis software module updates the database DB for the second device 2 with the parameters of the communication linked to the second received communication frame and the level of confidence assigned to this device.

The communication frame is thus validated and its processing is continued in accordance with the communication protocol that is used.

In step E1, the analysis software module then switches to standby, waiting for a new communication frame originating from the second device 2 in the communication session which is in progress and which has been maintained.

In step E60, if the parameters of the communication extracted for the received communication frame are not consistent with the stored parameters of the communication, the analysis software module then reduces the level of confidence assigned to the second device. This entails, for example, decrementing the corresponding counter by a value defined by default. This value may be common to all types of inconsistency or may be defined for each inconsistency type.

In step E70, the analysis software module then checks, by means of a checking module, the level of confidence assigned to the second device 2.

If the level of confidence has become insufficient (for example counter less than or equal to a threshold value), a new session key negotiation is requested in step E80. The level of confidence assigned to the second device 2 being too downgraded, the opening of a new secure communication session with the second device 2 is then necessary.

If the level of confidence assigned to the second device 2 remains acceptable (for example counter greater than said threshold value), the data included in the received communication frame are recorded and the analysis software module returns to step E7 and then continues with step E8. The analysis software module then switches to standby, waiting for a new communication frame originating from the second device 2, in accordance with step E1.

The solution according to the invention provides a convenient implementation since it is easily incorporated into the first device 1, notably within an SSL ("Secure Sockets Layer") or TLS ("Transport Layer Security") communication protocol. Within a protocol of this type, the communication stack remains identical, the analysis software module simply being added in order to decide whether or not to maintain the secure communication session.

According to the invention, if the secure communication session has recently been renewed, for example by comparing the time period that has elapsed since the last opening of a session with a threshold value, the analysis software module can accept the data of a communication frame even if the parameters of the communication linked to this communication frame are only partially adhered to.

The invention claimed is:

1. A communication analysis method implemented in a first device configured to receive communication frames originating from a second device, said first device and said second device being configured to establish a communication between themselves in a secure communication session, said method comprising:

storing parameters corresponding to the communication established with the second device during the secure communication session;

analyzing, in response to receiving a communication frame originating from the second device, the parameters of the communication during the reception of the communication frame in relation to the parameters stored for said communication; and determining a renewal or a maintenance of the secure communication session according to the analysis carried out, wherein the first device is a server including a microprocessor and the second device is a sensor with a microcontroller and a transmitter, and wherein the communication is a cryptographic communication in a wireless environment, wherein the analyzing further comprises checking a level of confidence assigned to the second device and when the level of confidence is downgraded in the event of inconsistency between the parameters of the communication during the reception of the communication frame and the parameters stored for said communication, renegotiating a new session key for the secure communication session.

2. The method according to claim 1, wherein the analyzing is implemented according to a basic analysis mode or according to an advanced analysis mode and when the analyzing is implemented according to in that, in the basic analysis mode, the stored parameters of the communication comprise:
 a frequency of reception of a communication frame originating from the second device, and
 a timestamping of a last received communication frame.

3. The method according to claim 2, wherein when the analyzing is implemented according to the advanced analysis mode, the stored parameters of the communication comprise:
 a type of data,
 a position of the data in the communication frame,
 a normal interval of the data,
 a number of distinct data in the communication frame.

4. A wireless communication system, comprising:
 a first device configured to receive communication frames,
 a second device being configured to transmit communication frames destined for the first device,
 said first device and said second device being configured to establish a communication between themselves in a secure communication session,
 wherein the first device comprises:
  means for storing parameters corresponding to the communication established with the second device during the communication session,
  an analysis software module configured to analyze, in response to receiving a communication frame, parameters of the communication during the reception of the communication frame originating from the second device in relation to the parameters stored for said communication and to determine, a renewal or a maintenance of the secure communication session according to the analysis carried out,
 wherein the analyzing further comprises checking a level of confidence assigned to the second device and when the level of confidence is downgraded in the event of inconsistency between the parameters of the communication during the reception of the communication frame and the parameters stored for said communication, renegotiating a new session key for the secure communication session.

5. The system according to claim 4, wherein the analysis software module functions according to a basic analysis mode or according to an advanced analysis mode and when the analyzing is implemented according to the basic analysis mode, the stored parameters of the communication comprise:
 a frequency of reception of a communication frame originating from the second device,
 a timestamping of a last received communication frame.

6. The system according to claim 5, wherein when the analysis software module functions according to the advanced analysis mode, the stored parameters of the communication comprise:
 a type of data,
 a position of the data in the communication frame,
 a normal interval of the data,
 a number of distinct data in the communication frame.

* * * * *